(12) United States Patent
Adachi

(10) Patent No.: US 10,627,569 B2
(45) Date of Patent: Apr. 21, 2020

(54) PLANAR LIGHTING DEVICE WITH STOPPER

(71) Applicant: MINEBEA MITSUMI Inc., Nagano (JP)

(72) Inventor: Kazumasa Adachi, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/968,906

(22) Filed: May 2, 2018

(65) Prior Publication Data

US 2018/0329136 A1 Nov. 15, 2018

(30) Foreign Application Priority Data

May 11, 2017 (JP) .................................. 2017-094796

(51) Int. Cl.
*F21V 8/00* (2006.01)
(52) U.S. Cl.
CPC .................................. *G02B 6/0091* (2013.01)
(58) Field of Classification Search
CPC .... G02B 6/008; G02B 6/0081; G02B 6/0083; G02B 6/0085; G02B 6/0086; G02B 6/0088; G02B 6/0093; G02B 6/009; G02B 6/0091; G02F 1/133615
See application file for complete search history.

(56) References Cited

U.S. PATENT DOCUMENTS

| | | | | | |
|---|---|---|---|---|---|
| 8,057,084 | B2* | 11/2011 | Song | ..................... | G02B 6/0023 362/612 |
| 8,297,827 | B2* | 10/2012 | Huang | ................. | G02B 6/0001 362/600 |
| 8,979,352 | B2* | 3/2015 | Hosoki | ................ | G02B 6/0091 349/60 |
| 8,998,476 | B2* | 4/2015 | Hosoki | ................ | G02B 6/0068 349/65 |
| 9,207,394 | B2* | 12/2015 | Zhang | ................... | G02B 6/0091 |
| 2007/0279944 | A1* | 12/2007 | Sakai | ................... | G02B 6/0031 362/633 |
| 2012/0249886 | A1* | 10/2012 | Kuromizu | ............ | G02B 6/0088 348/725 |
| 2014/0247398 | A1* | 9/2014 | Kakimoto | ............ | G02B 6/0055 348/729 |

FOREIGN PATENT DOCUMENTS

| | | |
|---|---|---|
| JP | 2014-170067 A | 9/2014 |
| JP | 2016-085803 A | 5/2016 |
| WO | 2011/074354 A1 | 6/2011 |

OTHER PUBLICATIONS

Notice of Reasons for Refusal dated Sep. 10, 2019 for corresponding Japanese Application No. 2017-094796 and English translation.

* cited by examiner

*Primary Examiner* — Robert J May
(74) *Attorney, Agent, or Firm* — Pearne & Gordon LLP

(57) ABSTRACT

A planar lighting device according to an embodiment includes a light guide plate, a light source, and a stopper. The light guide plate includes a light entering end surface that light enters. In the light source, a light emitting surface that emits light faces the light entering end surface. The stopper includes a facing end surface facing, in the light entering end surface, an area that does not face the light emitting surface of the light source, and controls the light guide plate to move in a direction approaching the light source.

16 Claims, 5 Drawing Sheets

PLANAR LIGHTING DEVICE WITH STOPPER

CROSS-REFERENCE TO RELATED APPLICATION

The present application claims priority to and incorporates by reference the entire contents of Japanese Patent Application No. 2017-094796 filed in Japan on May 11, 2017.

BACKGROUND OF THE INVENTION

1. Field of the Invention

The present invention relates to a planar lighting device.

2. Description of the Related Art

Conventionally, there has been a planar lighting device that includes what is called a top-view light source in which a board is implemented on a surface opposite to a light emitting surface emitting light. In the planar lighting device, for example, a light emitting surface of a light source and a light guide plate may contact each other (for example, refer to Japanese Laid-open Patent Publication No. 2016-85803).

However, when a light guide plate is thermally expanded in the conventional planar lighting device, a contacting light source is pressed. As a result, non-lighting of a light source due to impact at the time of pressing, deviation of an optical axis due to change in direction of a light emitting surface, and the like may occur, and this occurrence may cause quality of a product to be deteriorated.

SUMMARY OF THE INVENTION

A planar lighting device according to an embodiment includes a light guide plate, a light source, and a stopper. The light guide plate includes a light entering end surface that light enters. In the light source, a light emitting surface that emits light faces the light entering end surface. The stopper includes a facing end surface facing, in the light entering end surface, an area that does not face the light emitting surface of the light source, and controls the light guide plate to move in a direction approaching the light source.

DETAILED DESCRIPTION OF THE PREFERRED EMBODIMENTS

Figure 1:
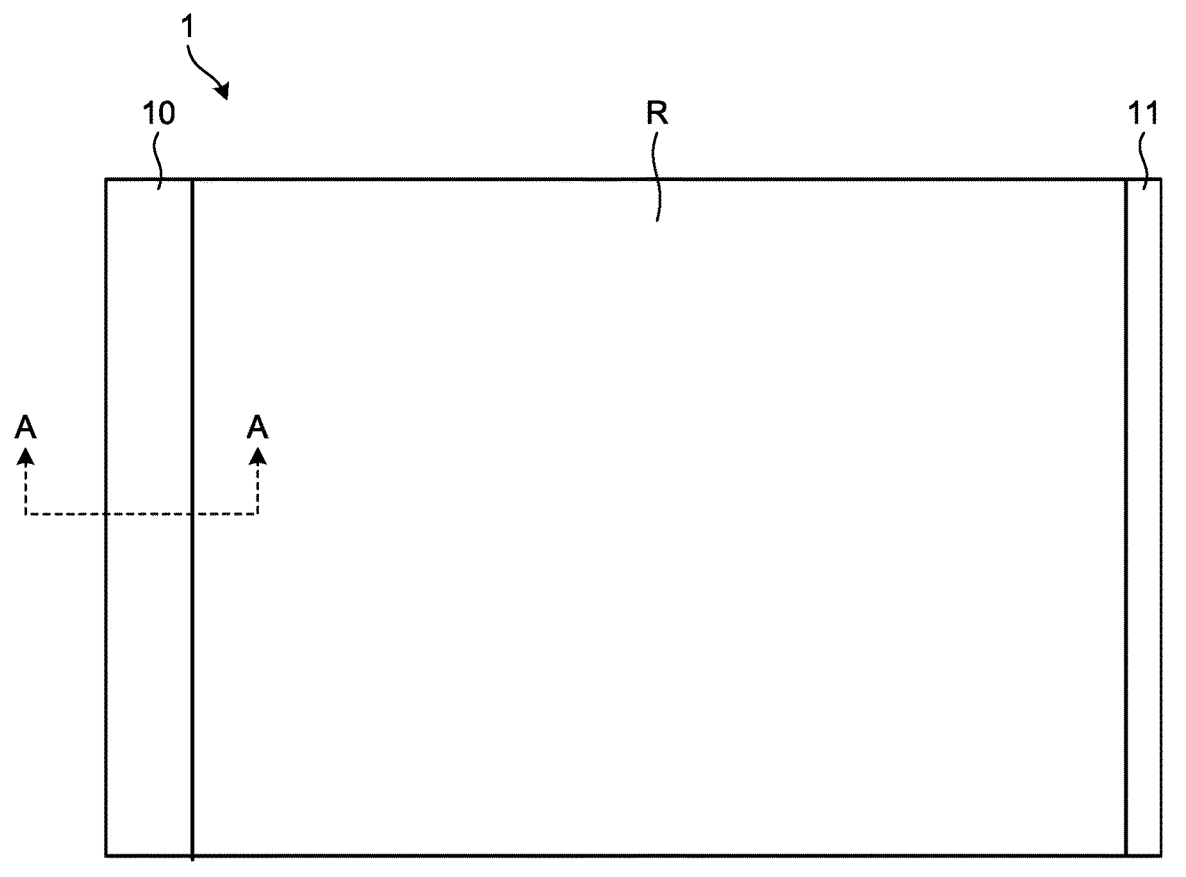
FIG. 1 is a top view illustrating a planar lighting device in accordance with an embodiment of the present invention.
Figure 1:
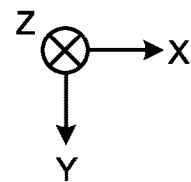

A planar lighting device according to an embodiment will now be described with reference to the accompanying drawings. The dimensional relation between components, the ratio of components, and the like in the drawings may differ from those of the reality. Among the drawings, there may be parts in which mutual dimensional relation and ratio differ.

Figure 2:
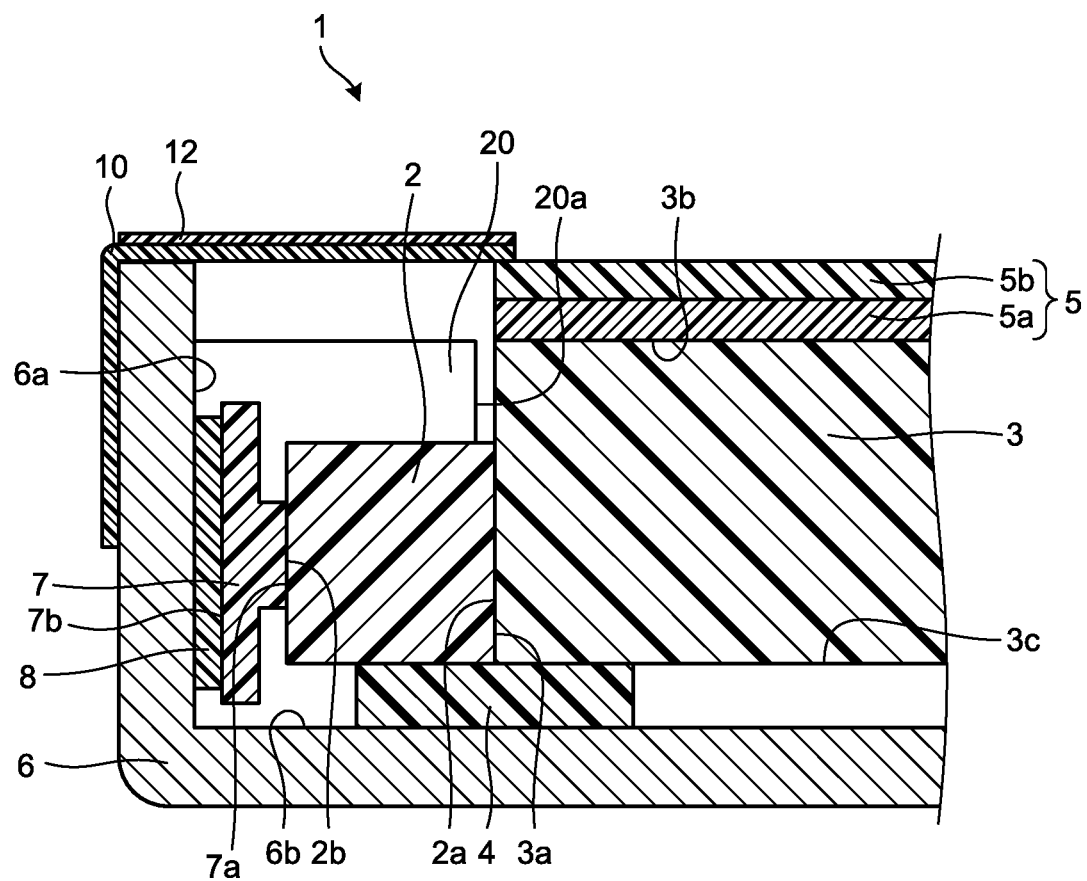
FIG. 2 is a sectional view illustrating the planar lighting device in accordance with the embodiment.
Figure 2:
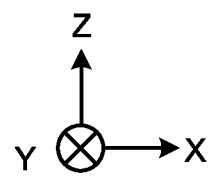

A configuration example of a planar lighting device 1 according to an embodiment will be described with reference to FIGS. 1 and 2. FIG. 1 is a top view illustrating the planar lighting device 1 in accordance with the embodiment. FIG. 2 is a sectional view illustrating the planar lighting device 1 in accordance with the embodiment. For clarifying explanation, FIG. 1 illustrates a three-dimensional orthogonal coordinate system in which an emitting direction of light in the planar lighting device 1 is defined as a Z-axis positive direction. Such an orthogonal coordinate system may be illustrated in other drawings used for the following description.

As illustrated in FIG. 1, the planar lighting device 1 according to the embodiment emits light from an emitting area (which is also referred to as an effective area) R that is not covered with light shielding units 10 and 11. In other words, the emitting area R is specified by the light shielding units 10 and 11. The planar lighting device 1 according to the embodiment is used as a backlight of a liquid crystal display device. Such a liquid crystal display device is used as a display device of an electronic device such as a smartphone, a mobile phone, and a personal computer (PC).

In FIG. 1, the width of the light shielding unit 10 on the left side (X-axis negative direction side) is wider than that of the light shielding unit 11 on the right side (X-axis positive direction side) when viewed from a top surface. This is because the light shielding unit 11 on the right side covers relatively a narrow area that does not include a light source 2 and a flexible printed circuit (FPC) 7, which will be described later, and the like, and the light shielding unit 10 on the left side covers relatively a wide area that includes the light source 2, the FPC 7, and the like. The width of the light shielding unit 10 on the left side is, for example, 1.5 mm. FIG. 1 does not illustrate a light shielding unit 12, which will be described later.

FIG. 2 is a sectional view illustrating the planar lighting device 1 when the planar lighting device 1 is sectioned along line A-A. As illustrated in FIG. 2, the planar lighting device 1 includes the light source 2, a light guide plate 3, a connection member 4, an optical sheet 5, a frame 6, the FPC 7, a fixing member 8, the light shielding units 10 and 12, and a stopper 20.

The light source 2 is a point-like light source. The light source 2 is, for example, a pseudo-white light-emitting diode (LED) formed of a blue LED and a yellow phosphor. The light source 2 faces a light entering end surface 3a of the light guide plate 3, and includes a light emitting surface 2a that emits light. Light enters the light entering end surface 3a of the light guide plate 3 from the light emitting surface 2a. The light source 2 is what is called a top-view LED in which a surface 2b opposite to the light emitting surface 2a is fixed to the FPC 7 (one example of a board).

The light guide plate 3 is formed in a rectangular shape when viewed from a top surface using a transparent material (for example, a polycarbonate resin). The light guide plate 3 includes the light entering end surface 3a, an emitting surface 3b, and an opposite surface 3c. The light entering end surface 3a goes along the light emitting surface 2a of the light source 2, and is a side surface that light of the light source 2 enters. The emitting surface 3b is a main surface in the Z-axis positive direction that indicates an emitting direction of light, and emits light that is incident from the light entering end surface 3a. In other words, the emitting surface 3b is a light extracting surface on which light from the light source 2 is mainly extracted. The light entering end surface 3a and the emitting surface 3b are in an intersecting positional relation.

The opposite surface 3c is a main surface opposite to the emitting surface 3b. The opposite surface 3c includes a light path change pattern formed of a plurality of dots. The light path change pattern formed on the opposite surface 3c causes an advancing direction side of light advancing through the light guide plate 3 to be changed and causes the light to be easily emitted from the emitting surface 3b. The opposite surface 3c side may be provided with a reflection sheet that reflects light leaking from the light guide plate 3 and returns the light to the light guide plate 3.

The connection member 4 connects the light source 2 with the light guide plate 3. Specifically, the connection member 4 is provided to a bottom wall 6b of the frame 6, which will be described later, and connects the light guide plate 3 with the light source 2 to bring the light emitting surface 2a of the light source 2 and the light entering end surface 3a of the light guide plate 3 into contact with each other. In this manner, the connection member 4 can match a light axis of the light source 2 and a light axis of the light guide plate 3.

In FIG. 2, the light emitting surface 2a of the light source 2 and the light entering end surface 3a of the light guide plate 3 contact each other, but they do not necessarily contact each other. A constant interval may be left between the light emitting surface 2a and the light entering end surface 3a. This point will be described later with reference to FIGS. 4A and 4B.

The optical sheet 5 includes a diffusion sheet 5a and a prism sheet 5b. The diffusion sheet 5a is disposed on the emitting surface 3b side of the light guide plate 3, and diffuses light emitted from the emitting surface 3b. The prism sheet 5b is disposed on a side opposite to the light guide plate 3 with respect to the diffusion sheet 5a, performs light distribution control on light diffused by the diffusion sheet 5a, and emits the light on which the light distribution control is performed.

The frame 6 houses the light source 2, the light guide plate 3, the connection member 4, the optical sheet 5, the FPC 7, the fixing member 8, and the stopper 20. The frame 6 is, for example, a stainless-steel sheet metal frame having relatively high rigidity and high reflectance of light. The frame 6 includes a side wall 6a and the bottom wall 6b.

The bottom wall 6b is a part that extends along the opposite surface 3c of the light guide plate 3, and is a plane surface without unevenness. The bottom wall 6b may have unevenness, for example, in the Z-axis direction. The side wall 6a is a part that extends along the light entering end surface 3a of the light guide plate 3, and has a plane surface without unevenness.

The FPC 7 is a flexible printed circuit board serving as a mounting board, and is provided with a circuit for supplying power to the light source 2. In the FPC 7, the surface 2b of the light source 2 is fixed to a fixing surface 7a side that is a light entering end surface 3a side, and the fixing member 8 is attached to a surface 7b opposite to the fixing surface 7a.

The fixing member 8 fixes the FPC 7 to the side wall 6a of the frame 6. The fixing member 8 is, for example, a double-sided tape, and is provided between the surface 7b of the FPC 7 and the side wall 6a of the frame 6. Specifically, in the fixing member 8, one of the main surfaces is provided to the surface 7b opposite to the fixing surface 7a fixing the light source 2 in the FPC 7, and the other is provided to an inner surface of the side wall 6a of the frame 6. A detailed configuration example of the fixing member 8 will be described later in FIG. 5.

The light shielding unit 10 is, for example, a single-sided tape having light shielding property, and is disposed so as to cover a part of the main surface of the prism sheet 5b on the Z-axis positive direction side that is an emitting direction side. The light shielding unit 10 shields against light emitted from, out of the emitting surface 3b of the light guide plate 3, a part of the area so as to specify the emitting area R where light is emitted from the planar lighting device 1.

In the light shielding unit 10, an end part on a side opposite to the prism sheet 5b extends to an outer surface of the frame 6. In other words, the light shielding unit 10 keeps proper tension and is hardly peeled off by extending to the outer surface of the frame 6 to be attached.

The light shielding unit 12 is, for example, a double-sided tape having light shielding property, and fixes the planar lighting device 1 and the liquid crystal display device. Specifically, in the light shielding unit 12, one of the main surfaces is attached to the light shielding unit 10, and the other is attached to the liquid crystal display device.

The following describes the conventional planar lighting device. When a light entering end surface of a light guide plate and a light emitting surface of a light source contact each other in the conventional planar lighting device, if the light guide plate is thermally expanded, the light emitting surface of the light source is pushed to a frame side (in FIG. 2, the X-axis negative direction) and is pressed.

As a result, the light source is pressed between the light guide plate and the frame, and the impact of the pressure may cause non-lighting. A connection member (in FIG. 2, the connection member 4) that connects the light source and the light guide plate is peeled off due to pressure and the light source moves upward (in FIG. 2, the Z-axis positive direction), thereby generating deviation of an optical axis on the light emitting surface.

When deviation of an optical axis occurs, light is directly emitted to an emitting surface side without passing through the light guide plate, and a hot spot extremely having high luminance and the like are generated. Conventionally, quality of a product may have been deteriorated.

The planar lighting device 1 according to the embodiment includes the stopper 20 that fixes the light guide plate 3. Specifically, the stopper 20 is provided to the light source 2 side, and includes a facing end surface 20a that faces the light entering end surface 3a. More specifically, the stopper 20 includes the facing end surface 20a that faces, in the light entering end surface 3a, an area that does not face the light emitting surface 2a of the light source 2, and controls the light guide plate 3 (light entering end surface 3a) to move in a direction approaching the light source 2. Examples of "Move in a direction approaching the light source 2" include a case where the light entering end surface 3a temporarily approaches the light emitting surface 2a of the light source 2 due to thermal expansion of the light guide plate 3.

In other words, in the planar lighting device 1 according to the embodiment, when the light entering end surface 3a pushes the light emitting surface 2a to the side wall 6a side of the frame 6 due to thermal expansion of the light guide plate 3, the facing end surface 20a of the stopper 20 receives the light entering end surface 3a.

In this manner, the light entering end surface 3a cannot push the light emitting surface 2a, and the light source 2 is not pressed. As a result, non-lighting and deviation of an optical axis described above do not occur. Thus, the planar lighting device 1 according to the embodiment can prevent deterioration in quality of a product. Hereinafter, the stopper 20 according to the embodiment will be described in detail with reference to FIGS. 3 to 6.

Figure 3:
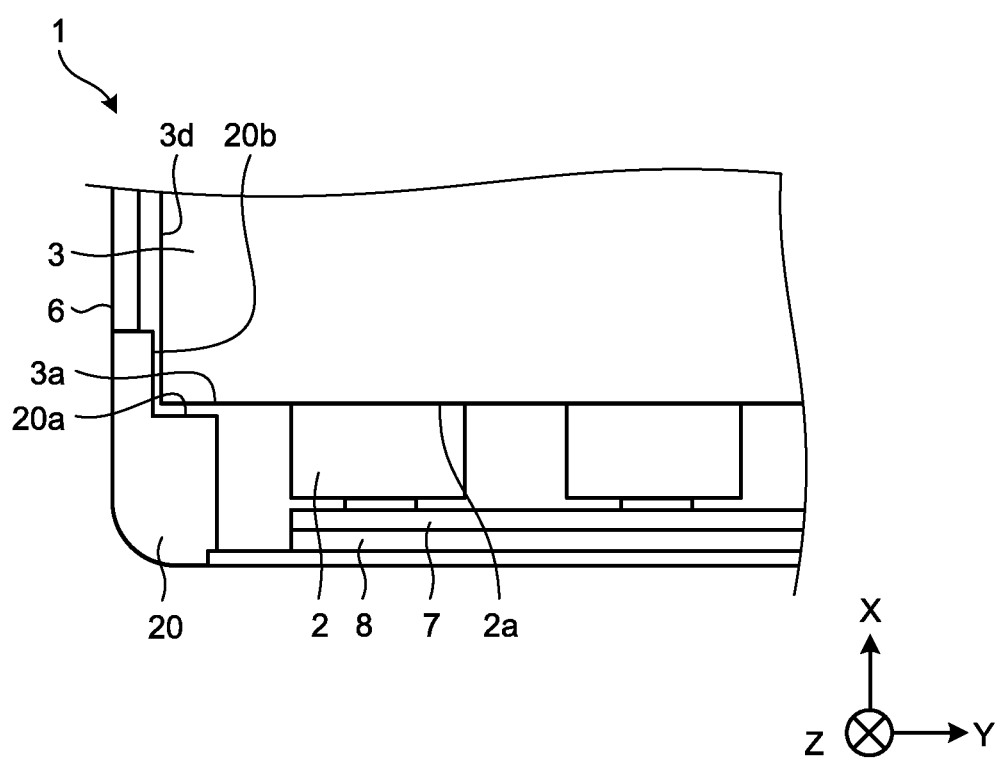
FIG. 3 is a top view illustrating the planar lighting device in accordance with the embodiment.

With reference to FIG. 3, the following describes the stopper 20 according to the embodiment when the stopper 20 is viewed from a top surface. FIG. 3 is a top view illustrating the planar lighting device 1 in accordance with the embodiment. FIG. 3 illustrates the top view in which an upper left corner (X-axis and Y-axis negative directions) in the top view illustrated in FIG. 1 is enlarged. FIG. 3 does not illustrate the light shielding units 10 and 12 from the perspective of viewability.

As illustrated in FIG. 3, the stopper 20 is provided to a corner of the frame 6 and has two facing end surfaces 20a and 20b disposed in conformity with a shape of a corner of the light guide plate 3. The stopper 20 is, for example, a resin and is integrally formed with an unillustrated resin part of the frame 6 by insert molding. The stopper 20 may be formed of a member different from that of the resin part of the frame 6.

The stopper 20 may be relatively a hard resin such as plastic, and may be an elastic resin such as rubber. The stopper 20 is not limited to a resin, may be a material the thermal expansion coefficient of which is not extremely higher than that of the light guide plate 3, and may be preferably a material the thermal expansion coefficient of which is lower than that of the light guide plate 3. In this manner, the stopper 20 does not press the light source 2 and the light guide plate 3 to prevent deterioration in quality.

As illustrated in FIG. 3, the facing end surface 20a of the stopper 20 is disposed so as to face the light entering end surface 3a of the light guide plate 3. The facing end surface 20b of the stopper 20 is disposed so as to face an end surface 3d adjacent to the light entering end surface 3a. The facing end surfaces 20a and 20b may contact the light entering end surface 3a and the end surface 3d, respectively.

Illustration is omitted in FIG. 3, but the pair of stoppers 20 is provided so as to face both end parts of the light entering end surface 3a of the light guide plate 3 in a longitudinal direction (Y-axis direction). In other words, the pair of stoppers 20 is provided to both end parts of the side wall 6a of the frame 6 in a longitudinal direction (Y-axis direction). The pair of stoppers 20 can surely prevent the light source 2 from being pressed by the light guide plate 3.

Figure 4A:
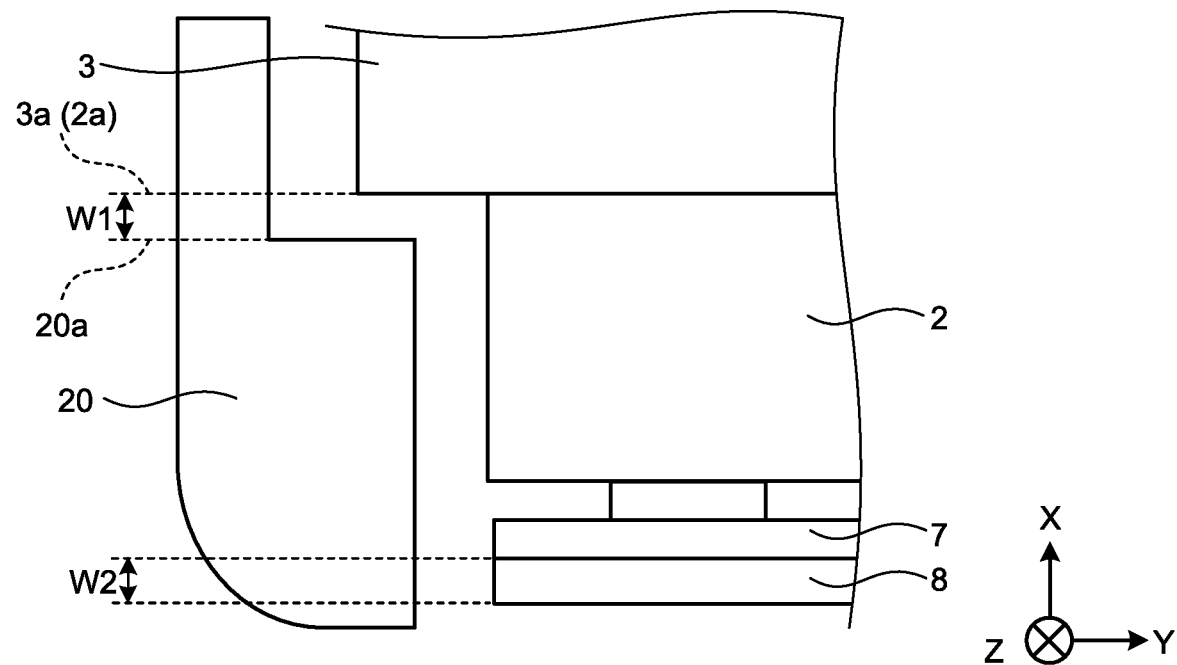
FIG. 4A is a view illustrating a positional relation of a stopper in accordance with the embodiment.
Figure 4B:
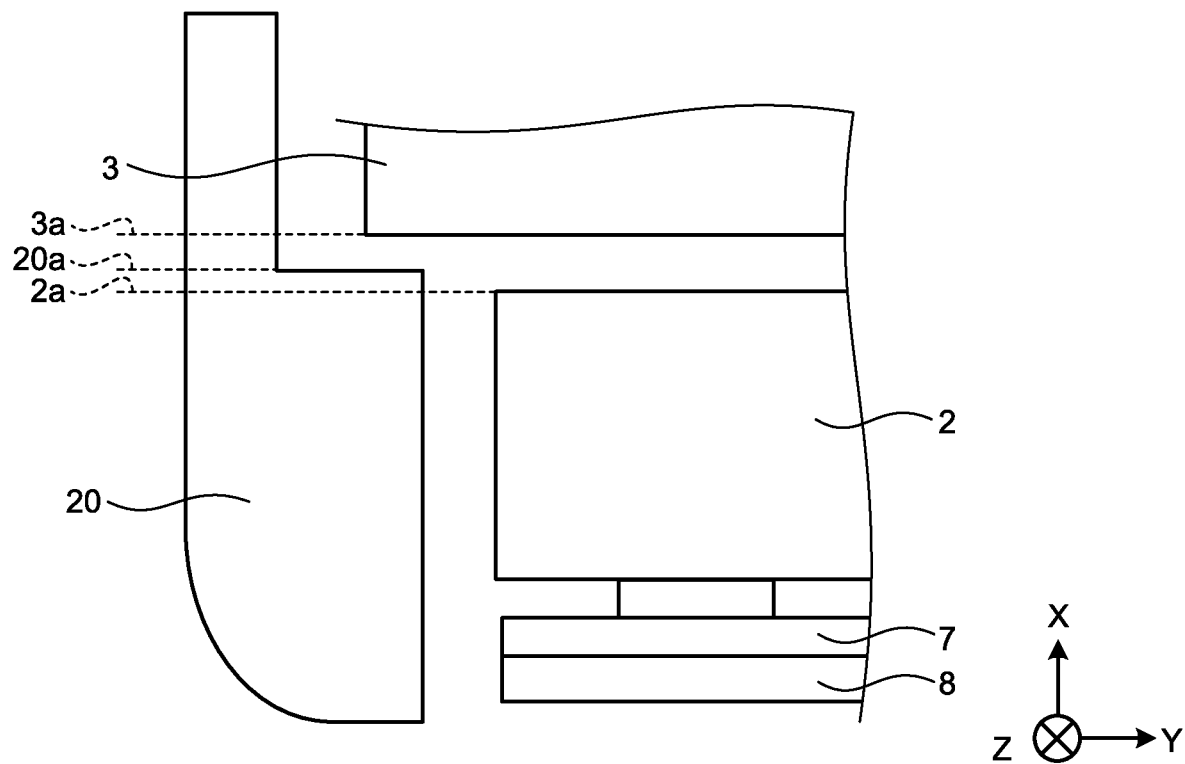
FIG. 4B is a view illustrating a positional relation of the stopper in accordance with the embodiment.

The following describes the positional relation of the stopper 20 with reference to FIGS. 4A and 4B. FIGS. 4A and 4B are views illustrating the positional relation of the stopper 20 in accordance with the embodiment. FIG. 4A illustrates a case where the light emitting surface 2a of the light source 2 and the light entering end surface 3a of the light guide plate 3 contact each other. FIG. 4B illustrates a case where the light emitting surface 2a and the light entering end surface 3a are separated from each other.

As illustrated in FIG. 4A, when the light emitting surface 2a and the light entering end surface 3a contact each other, the facing end surface 20a of the stopper 20 is disposed at an interval W1 on the FPC 7 side than the light emitting surface 2a and the light entering end surface 3a. In other words, the facing end surface 20a of the stopper 20 is disposed separately from a surface along the light emitting surface 2a (which indicates an area on the same plane as the light emitting surface 2a) and the light entering end surface 3a.

In the positional relation of the stopper 20 illustrated in FIG. 4A, the light emitting surface 2a and the light entering end surface 3a do not necessarily contact each other, and the light emitting surface 2a and the light entering end surface 3a may be separated from each other. In such a case, the facing end surface 20a is disposed on the FPC 7 side than the light emitting surface 2a. In other words, the facing end surface 20a of the stopper 20 is disposed farther away from the light entering end surface 3a than the light emitting surface 2a is.

For example, bringing the light emitting surface 2a and the light entering end surface 3a into contact with each other can narrow a width of the light shielding unit 10 on the light source 2 side. This can prevent deterioration in quality while implementing frame narrowing and high luminance.

It is preferable that the interval W1 between the facing end surface 20a and the light entering end surface 3a be equal to or less than a thickness W2 of the fixing member 8. In other words, when the light guide plate 3 is expanded with a rise in temperature from ordinary temperature or the like and the light entering end surface 3a pushes the light emitting surface 2a, this expansion can be allowed to a maximum amount of the thickness W2. In other words, the fixing member 8 functions as a cushion to allow the light emitting surface 2a to be pushed by an amount of the thickness W2. In this manner, the light source 2 is not pressed, and this surely prevents deterioration in quality such as non-lighting due to impact of pressure.

As illustrated in FIG. 4B, when the light emitting surface 2a and the light entering end surface 3a are separated from each other, the facing end surface 20a of the stopper 20 is disposed between the surface along the light emitting surface 2a (which indicates an area on the same plane as the light emitting surface 2a) and the light entering end surface 3a. "Between the surface along the light emitting surface 2a and the light entering end surface 3a" includes being on the same plane as the light emitting surface 2a or the light entering end surface 3a.

In this manner, a pushing force of the light entering end surface 3a is prevented from being exerted on only the light emitting surface 2a to surely prevent deterioration in quality. When the facing end surface 20a is disposed closer to a light entering end surface 3a than the light emitting surface 2a is, contact of the light emitting surface 2a with the light entering end surface 3a can be prevented to surely eliminate non-lighting of the light source 2 due to impact.

Figure 5:
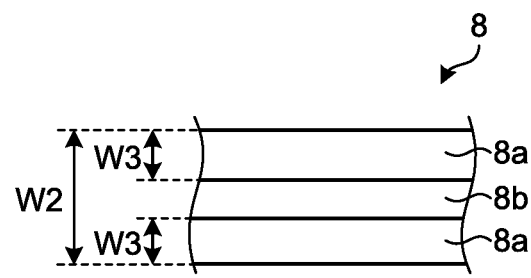
FIG. 5 is a view illustrating the configuration of a fixing member in accordance with the embodiment.

The following describes the layer configuration of the fixing member 8 according to the embodiment with reference to FIG. 5. FIG. 5 is a view illustrating the configuration of the fixing member 8 in accordance with the embodiment. The configuration of the fixing member 8 illustrated in FIG. 5 is one example, but this is not limiting.

As illustrated in FIG. 5, in the fixing member 8, for example, a base material 8b is sandwiched between adhesion layers 8a. Examples of the adhesion layers 8a include a pressure sensitive adhesive such as acrylic and silicone resins. Examples of the base material 8b include polyethylene terephthalate (PET).

In other words, in the fixing member 8, the interval W1 (refer to FIG. 4A) between the facing end surface 20a and the light entering end surface 3a can be left by an amount of the thickness W3 of the adhesion layers 8a (In FIG. 5, a total value of the two thicknesses W3). The base material 8b can be omitted. In other words, the thickness W2 of the fixing member 8 is only the thickness W3 of the adhesion layers 8a.

As described above, the planar lighting device 1 according to the embodiment includes the light source 2, the light guide plate 3, and the stopper 20. The light guide plate 3 includes the light entering end surface 3a that light enters. In the light source 2, the light emitting surface 2a that emits light faces the light entering end surface 3a. The stopper 20 includes the facing end surface 20a facing, in the light entering end surface 3a, an area that does not face the light emitting surface 2a of the light source 2, and controls the light guide plate 3 to move in a direction approaching the light source 2. In this manner, the light source 2 is not pressed, and defects such as non-lighting and deviation of an optical axis do not occur. Thus, deterioration in quality of a product can be prevented. The light source 2 according to the present invention is not limited to a top-view type, but may be, for example, a side-view type.

In the planar lighting device 1 according to the embodiment, the facing end surface 20a of the stopper 20 is disposed between a surface along the light emitting surface 2a and the light entering end surface 3a. This disposition can prevent a pushing force of the light entering end surface 3a from being exerted on only the light emitting surface 2a to surely prevent deterioration in quality. When the facing end surface 20a is disposed closer to the light entering end surface 3a than the light emitting surface 2a is, contact of the light emitting surface 2a with the light entering end surface 3a can be prevented to surely eliminate non-lighting of the light source 2 due to impact.

In the planar lighting device 1 according to the embodiment, the facing end surface 20a of the stopper 20 is disposed farther away from the light entering end surface 3a than a surface along the light emitting surface 2a is. For example, bringing the light emitting surface 2a and the light entering end surface 3a into contact with each other can narrow a width of the light shielding unit 10 on the light source 2 side. Thus, deterioration in quality can be prevented, and frame narrowing and high luminance can be implemented.

The planar lighting device 1 according to the embodiment further includes the frame 6, the board (FPC 7), and the fixing member 8. The frame 6 includes the side wall 6a that faces the light entering end surface 3a. On the board (FPC 7), a surface opposite to the light emitting surface 2a of the light source 2 is fixed. The fixing member 8 is provided to a surface opposite to the fixing surface that fixes the light source 2 on the board, and fixes the board to the side wall 6a. In this manner, even when the light guide plate 3 is expanded, the light source 2 is not pressed or pressing force thereto can be reduced, so as to surely prevent deterioration in quality such as non-lighting due to impact of pressure.

In the stopper 20 of the planar lighting device 1 according to the embodiment, the interval W1 between the facing end surface 20a and the light entering end surface 3a is equal to or less than the thickness W2 of the fixing member 8. In this manner, even when the light guide plate 3 is expanded, the light source 2 is not pressed or pressing force thereto can be reduced, so as to surely prevent deterioration in quality such as non-lighting due to impact of pressure.

In the planar lighting device 1 according to the embodiment, the stopper 20 is integrally formed with the side wall 6a, and the pair of stoppers 20 is provided to both end parts of the side wall 6a in the longitudinal direction. Providing the pair of stoppers 20 can surely prevent the light source 2 from being pressed by the light guide plate 3.

In the planar lighting device 1 according to the embodiment, a thermal expansion coefficient of the stopper 20 may be lower than that of the light guide plate 3. In this manner, the stopper 20 does not press the light source 2 and the light guide plate 3 to prevent deterioration in quality.

The embodiment described above shows that the light entering end surface 3a of the light guide plate 3 and the adjacent end surface 3d are orthogonal to each other (refer to FIG. 3), but the light entering end surface 3a and the end surface 3d are not necessarily orthogonal to each other. This point is described with reference to FIG. 6.

Figure 6:
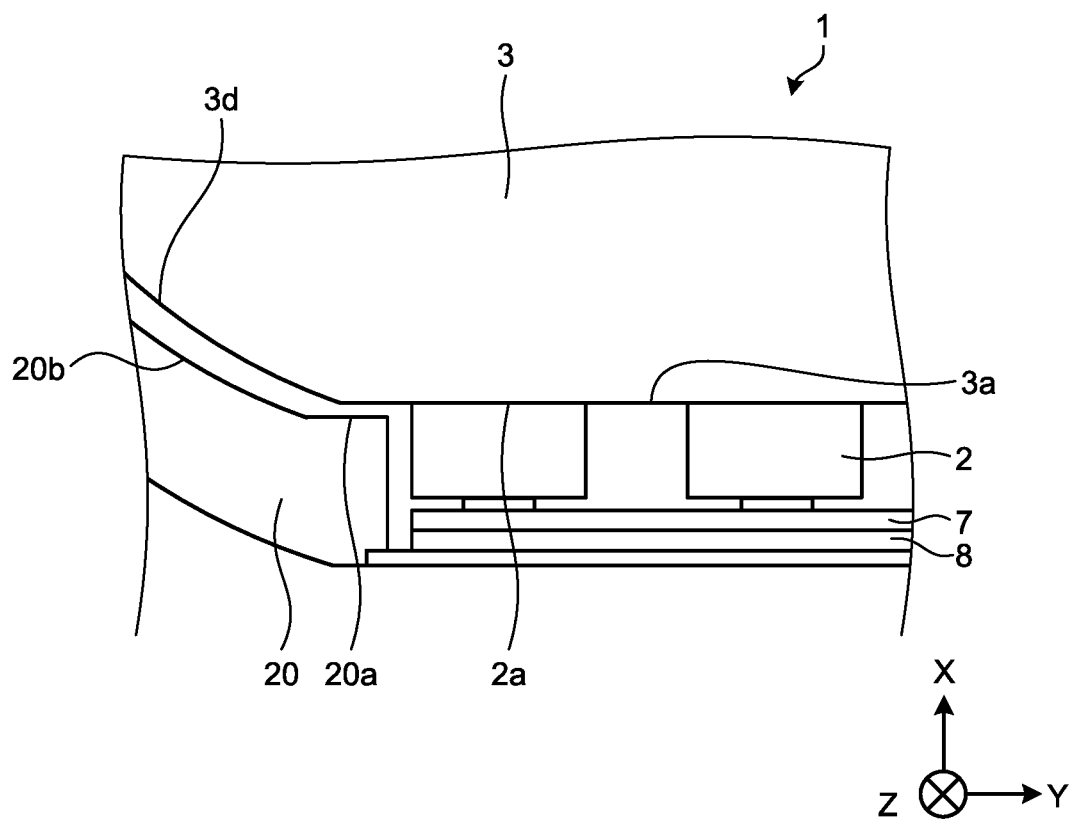
FIG. 6 is a top view illustrating the planar lighting device in accordance with a modification.

FIG. 6 is a top view illustrating the planar lighting device 1 in accordance with a modification. As illustrated in FIG. 6, the end surface 3d adjacent to the light entering end surface 3a of the light guide plate 3 has a roundly curved surface shape when viewed from a top surface. In other words, in the planar lighting device 1 according to the modification, a corner has an arc shape than that of the embodiment described above.

In such a case, the facing end surface 20b of the stopper 20 has a curved surface shape in conformity with the end surface 3d, as compared with a case where the facing end surface 20a has a linear shape in conformity with the light entering end surface 3a. In this manner, forming the facing end surface 20b in a shape in conformity with the end surface 3d enables the stopper 20 to be applied to the planar lighting device 1 in any shape.

An embodiment of the present invention can provide a planar lighting device capable of preventing deterioration in quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
    a light guide plate that includes a light entering end surface that light enters;
    a light source in which a light emitting surface emitting the light faces the light entering end surface; and
    a stopper that includes a facing end surface facing, in the light entering end surface, an area that does not face the light emitting surface of the light source, and controls the light guide plate to move in a direction approaching the light source, wherein the stopper has the facing end surface that is disposed farther away from the light entering end surface than a surface along with the light emitting surface is.

2. The planar lighting device according to claim 1, further comprising:
    a frame that includes a side wall facing the light entering end surface;
    a board to which a surface opposite to the light emitting surface of the light source is fixed; and
    a fixing member that is provided to a surface opposite to a fixing surface fixing the light source on the board, and fixes the board to the side wall.

3. The planar lighting device according to claim 2, wherein the stopper has an interval between the facing end surface and the light entering end surface that is equal to or less than a thickness of the fixing member.

4. The planar lighting device according to claim 3, wherein the stopper is integrally formed with the side wall, and a pair of stoppers is provided to both end parts of the side wall in a longitudinal direction.

5. The planar lighting device according to claim 2, wherein the stopper is integrally formed with the side wall, and a pair of stoppers is provided to both end parts of the side wall in a longitudinal direction.

6. The planar lighting device according to claim 1, wherein a thermal expansion coefficient of the stopper is lower than a thermal expansion coefficient of the light guide plate.

7. A planar lighting device comprising:
a light guide plate that includes a light entering end surface that light enters;
a light source in which a light emitting surface emitting the light faces the light entering end surface; and
a stopper that includes a facing end surface facing, in the light entering end surface, an area that does not face the light emitting surface of the light source, and controls the light guide plate to move in a direction approaching the light source;
a frame that includes a side wall facing the light entering end surface; wherein
the stopper is integrally formed with the side wall, and a pair of stoppers is provided to both end parts of the side wall in a longitudinal direction, and
the stopper has the facing end surface that is disposed farther away from the light entering end surface than a surface along with the light emitting surface.

8. The planar lighting device according to claim 7, further comprising:
a board to which a surface opposite to the light emitting surface of the light source is fixed; and
a fixing member that is provided to a surface opposite to a fixing surface fixing the light source on the board, and fixes the board to the side wall.

9. The planar lighting device according to claim 8, wherein the stopper has an interval between the facing end surface and the light entering end surface that is equal to or less than a thickness of the fixing member.

10. The planar lighting device according to claim 7, wherein a thermal expansion coefficient of the stopper is lower than a thermal expansion coefficient of the light guide plate.

11. A planar lighting device comprising:
a light guide plate that includes a light entering end surface that light enters;
a light source in which a light emitting surface emitting the light faces the light entering end surface; and
a stopper that includes a pair of facing end surfaces facing, in the light entering end surface, an area that does not face the light emitting surface of the light source, and controls the light guide plate to move in a direction approaching the light source, wherein the pair of facing end surfaces faces with each of both corners of the light entering end surface of the light guide plate, and is disposed in conformity with a shape of each of the corners,
a pair of adjacent end surfaces that is adjacent to the light entering end surface of the light guide plate has a roundly curved surface shape when viewed from a top surface so that each of the corners have an arc shape, and
the pair of facing end surfaces has a roundly curved shape in conformity with a shape of each of the arc-shaped corners.

12. The planar lighting device according to claim 11, wherein the stopper has the facing end surface disposed between a surface along with the light emitting surface and the light entering end surface.

13. The planar lighting device according to claim 11, wherein the stopper has the facing end surface that is disposed farther away from the light entering end surface than a surface along with the light emitting surface is.

14. The planar lighting device according to claim 13, wherein the stopper has an interval between the facing end surface and the light entering end surface that is equal to or less than a thickness of the fixing member.

15. The planar lighting device according to claim 11, further comprising:
a frame that includes a side wall facing the light entering end surface;
a board to which a surface opposite to the light emitting surface of the light source is fixed; and
a fixing member that is provided to a surface opposite to a fixing surface fixing the light source on the board, and fixes the board to the side wall.

16. The planar lighting device according to claim 11, wherein a thermal expansion coefficient of the stopper is lower than a thermal expansion coefficient of the light guide plate.

* * * * *